UNITED STATES PATENT OFFICE.

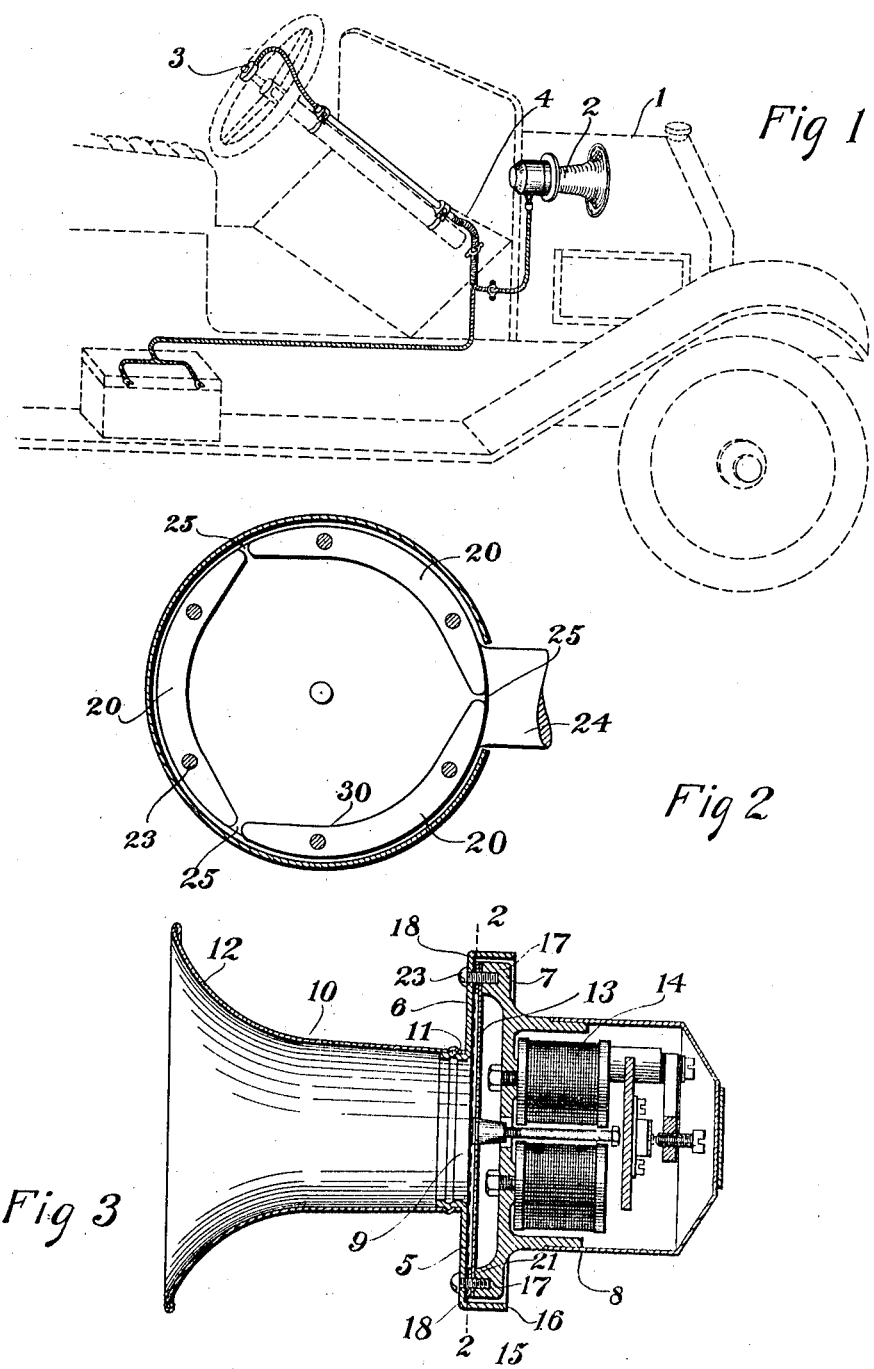

RAY H. MANSON, OF ELYRIA, OHIO, ASSIGNOR TO THE DEAN ELECTRIC COMPANY, OF ELYRIA, OHIO, A CORPORATION OF OHIO.

ALARM-SIGNAL DEVICE.

1,020,768.  Specification of Letters Patent.  Patented Mar. 19, 1912.

Application filed May 10, 1911. Serial No. 626,216.

*To all whom it may concern:*

Be it known that I, RAY H. MANSON, a citizen of the United States, residing at Elyria, in the county of Lorain and State of Ohio, have invented certain new and useful Improvements in Alarm-Signal Devices; and I do hereby declare the following to be a full, clear, and exact description of my invention, such as will enable others skilled in the art to which it appertains to make and use the same.

My invention relates to alarm signal devices adapted to be used in exposed positions and finds a use in connection with conveyances, such as automobiles, motor boats, etc., it being understood that I do not desire to limit the device of my invention to this particular use. When used upon rapidly moving vehicles, dust, dirt, moisture and other foreign matter are apt to be thrown through the mouth of the horn into the interior thereof, or caught by the horn and carried into the interior. In either case, this matter lodging against the diaphragm or other exposed part of the mechanism when sufficiently accumulated, would interfere with the proper operation of the device.

One of the objects of my invention is the prevention of the lodging of foreign matter inside the horn and thereby avoiding the accumulation of such matter and its injurious effect upon the instrument. I may realize this object by providing means for creating a draft through that part of the instrument into which the foreign matter is carried, thus drawing the foreign matter straight on through the chamber. This object can be best realized by providing orifices in the walls of the chamber of the signal device in such a position that a draft will be insured when the vehicle is in motion or when air is being forced into the mouth of the device. Inasmuch as some of the particles of foreign matter tend to gravitate toward the bottom of the chamber into which they are projected, it is expedient to provide one of the orifices adjacent the bottom of the chamber in order that the draft may be in the direction in which the particles tend to gravitate.

I regard the invention of this application an improvement on the inventions disclosed in applications #624,330, May 1, 1911 of William W. Dean and #622,858, filed April 24, 1911 by me.

Other objects of my invention and the invention itself will be best understood by referring to the following description when taken in connection with the accompanying illustration showing one specific embodiment thereof, while the scope will be more particularly pointed out in the appended claims.

Figure 1 is a signaling device mounted upon a conveyance illustrating the use to which my invention is placed. Fig. 2 shows a section through line 2—2 of Fig. 3 looking toward the front. Fig. 3 is a cross section of a signaling device made in accordance with my invention taken along a longitudinal axis thereof.

Referring now to the drawings and to the form of my invention shown therein, at 1 is shown a portion of a conveyance, such as an automobile upon which an alarm signal device, here shown as an electrically controlled horn is mounted. When mounted upon a vehicle in this manner, particles of foreign matter, such as dirt, dust, moisture, etc., are apt when the vehicle is in motion forward, to be projected into the mouth of the device and fall thence into the chamber in front of the diaphragm or become involved with other parts of the mechanism. The signal device is in the form shown controlled by a circuit controller 3 mounted upon the steering device and is connected thereto by conductors 4. A plurality of parts of the device form a chamber 5 in the signal device, one of these parts 6 constituting a front wall and a second part 7 constituting a portion of the back wall. A part 8 also forms a portion of one of the walls of this chamber. The front wall 5, is provided with an opening 9 for the passage of sound waves and a resonator 10 is preferably mounted in the opening 11. This resonator is expanded at the end 12 into a bell shape, thus making the elements of the instrument curved. A vibratile member, preferably a diaphragm 13 is located in the chamber 5 and in the form shown divides the chamber into two parts. This diaphragm when vibrated is adapted to initiate sound waves which pass through the opening 9 and are amplified by the resonator 10 when such resonator is employed in connection with the signaling device. The diaphragm is actuated by some suitable means, such as an electro-magnet 14. The outer edges of the front wall 5 are folded over as shown at 15 and extended to the rear as shown at 16. When fitted to the part 7, this folded over edge laps over the edge 17 of the part 7 forming a channel 18 between these parts, which permits air carrying the dust, dirt and other matter to pass straight on through the chamber and out to the rear or to the other direction in which this channel is pointed.

In order to regulate the draft through the instrument, I employ draft regulating means 20 which are placed inside of the channel 18 to close a portion of this channel. As shown, these elements are mounted between the main part of the front wall and the front edge 21 of the part 7. The diaphragm 13 may be clamped around the edge between the front part 5 and the part 7. In the form shown, the draft regulating members 20 are mounted on top of the diaphragm between the edge thereof and the front wall 5 and the parts secured together by screws 23. An arm 24 is attached to the device by means of which it may be secured to a conveyance or to some pedestal or other mounting means. The regulating members 20 may be readily removed and others substituted therefor, in order to increase or diminish the spaces 25 which are formed between the ends of these members. In the form shown, I provide three such openings in order that one may always be adjacent the lower edge of the chamber when the signal device is mounted either upon the right hand or left hand side of the machine or when it is mounted with the arm 24 vertical. I do this in order that the particles which are carried by gravity toward the bottom of the chamber may be the more readily drawn outward by the draft. It is not essential that these openings be exactly at the bottom of the chamber, but as shown in Fig. 2 may be to one side of the bottom and when so positioned, I prefer to so shape the members 20 that the inner edge will incline from the point 30 to the opening 25, the point 30 being located approximately on a vertical line passing through the center of the chamber. By this arrangement I prevent the regulating member from obstructing the draft, as were it made perfectly arc shaped, the hooked end of the member between 30 and the opening 25 might catch and retain some of the foreign substances, though I may make the said member arc shaped upon the inner edge without interfering with the cleaning effect of the draft.

In the form shown, I have provided three openings substantially one hundred and twenty degrees apart. When the signal device is mounted with the arm horizontal, one of these openings will be adjacent the lowest point and when mounted with the arm vertical the other will be at the bottom.

It will be apparent that I may employ any suitable means for actuating the diaphragm; that I may omit the resonator if desirable, and that the openings 25 may be made of any suitable size. Likewise, any suitable means may be employed for mounting the signal device.

It will also be obvious that numerous and extensive departures from the forms and details of the apparatus here shown may be made without departing from the spirit of this invention, the same being herein shown solely for the purpose of illustrating one specific embodiment thereof.

I claim:

1. In an alarm signal device adapted to be used upon conveyances, a plurality of parts forming the walls of a chamber, one of said parts having its edges folded over the edge of another of said parts leaving a channel between said edges which communicates with said chamber for the passage of foreign matter through said chamber, said channel leading to the exterior of said signal device, a vibratile diaphragm in said chamber adapted when actuated to produce sound, means for actuating said diaphragm, the forward wall of said chamber being provided with an opening for the passage of sound waves.

2. In an alarm signal device adapted to be used upon conveyances, a plurality of parts forming the walls of a chamber, one of said parts having its edges folded over the edges of another of said parts leaving a channel between said edges, which provides an opening in said chamber for the passage of foreign matter through said chamber to the exterior, means for regulating said opening, a vibratile diaphragm in said chamber adapted when actuated to produce sound, means for actuating said diaphragm, the forward wall of said chamber being provided with an opening for the passage of sound waves.

3. In an alarm signal device, adapted to be used upon conveyances, a plurality of parts forming the walls of a chamber, one of said parts being a rear wall part, another of said parts being a front wall part and having its edge folded over the edge of said rear wall part leaving a rearwardly directed channel between said parts to permit the creation of a draft through the chamber for the passage of foreign matter through said chamber to the exterior thereof, a plurality of draft regulating members mounted in said channel leaving openings therebetween, said chamber having an opening in the front wall for the passage of sound waves, a vibratile diaphragm in said chamber adapted when actuated to initiate sound and means in said chamber to actuate said diaphragm.

4. In an alarm signal device adapted to be used upon conveyances, a rear chamber wall, a front chamber wall having its edges folded over the edge of the rear chamber wall leaving a channel therebetween to permit a draft through said chamber for the passage of foreign matter through said chamber to the exterior, draft regulating members mounted between said rear wall and said front wall leaving draft openings therebetween, a vibratile diaphragm in said chamber adapted when vibrated to initiate sound and means to actuate said diaphragm.

5. In an alarm signal device adapted to be used upon conveyances, a plurality of parts forming the walls of a chamber, one of said parts being provided with an opening for the passage of sound waves, a forwardly directed resonator mounted in said opening, another of said parts constituting a second wall part for said chamber, the edge of the first named wall part being folded over the edge of the second named part and spaced therefrom to create a channel between said parts, whereby a draft may be allowed to flow through the chamber to the exterior thereof for the passage of dirt, moisture, etc., therethrough, draft regulating members mounted between said parts in said channel leaving openings in said channel, a vibratile diaphragm in said chamber adapted when actuated to initiate sound and means to actuate said diaphragm.

6. In an alarm signal device adapted to be used upon conveyances, a plurality of parts forming the walls of a chamber, one of said parts being provided with an opening for the passage of sound waves, a forwardly directed resonator mounted in said opening, another of said parts constituting a second wall part for said chamber, the edge of the first named wall part being folded over the edge of the second named part and spaced therefrom to create a channel between said parts, whereby a draft may be allowed to flow through the chamber to the exterior thereof for the passage of dirt, moisture, etc., therethrough, draft regulating members mounted between said parts in said channel, leaving openings in said channel, said regulating members being substantially arc shaped and inclined upon the inside edges toward the ends, means to attach said device to a conveyance, a vibratile diaphragm in said chamber adapted when actuated to initiate sound and means to actuate said diaphragm.

7. In an alarm signal device adapted to be used upon conveyances, a plurality of parts forming the walls of a chamber, one of said parts being provided with an opening for the passage of sound waves, a forwardly directed resonator mounted in said opening, another of said parts constituting a second wall part for said chamber, the edge of the first named wall part being folded over the edge of the second named part and spaced therefrom to create a channel between said parts whereby a draft may be allowed to flow through the chamber to the exterior thereof for the passage of dirt, moisture, etc., therethrough, draft regulating members mounted between said parts in said channel leaving openings in said channel, said regulating members being substantially arc shaped and inclined upon the inside edges toward the ends, means to attach said device to a conveyance, a vibratile diaphragm clamped between said first and second named wall parts adapted when actuated to initiate sound and means to actuate said diaphragm.

8. In an alarm signal device adapted to be used upon conveyances, a plurality of parts forming the walls of a chamber, means for fastening the walls of the chamber together, two of said walls being spaced apart forming a channel between them, which communicates with the interior of the chamber and the exterior of the device, a vibratile diaphragm in said chamber adapted when actuated to originate sound waves and means for actuating said diaphragm, the forward wall of said chamber being provided with an opening for the passage of sound waves.

In testimony whereof I affix my signature in the presence of two witnesses.

RAY H. MANSON.

Witnesses:
A. D. T. LIBBY,
F. O. RICHEY.

---

Copies of this patent may be obtained for five cents each, by addressing the "Commissioner of Patents, Washington, D. C."